United States Patent [19]

Kubo et al.

[11] Patent Number: 5,186,976
[45] Date of Patent: Feb. 16, 1993

[54] METHOD FOR PRODUCING SHEET-FORMED RECORDING MEDIUM

[75] Inventors: Hiroshi Kubo, Odawara; Keitetsu Imahuzi, Chofu, both of Japan

[73] Assignee: Fuji Photo Film Co., Ltd., Kanagawa, Japan

[21] Appl. No.: 810,450

[22] Filed: Dec. 19, 1991

Related U.S. Application Data

[63] Continuation of Ser. No. 501,582, Mar. 29, 1990.

[30] Foreign Application Priority Data

| Mar. 29, 1989 | [JP] | Japan | 1-74922 |
| Mar. 29, 1989 | [JP] | Japan | 1-74923 |
| Oct. 19, 1989 | [JP] | Japan | 1-270441 |
| Oct. 19, 1989 | [JP] | Japan | 1-270442 |

[51] Int. Cl.$^5$ ............................................. B05D 5/12
[52] U.S. Cl. ................................... 427/129; 427/128; 427/130; 427/444; 428/65; 428/694; 428/900
[58] Field of Search ................. 427/127-132, 427/48; 428/694, 695, 900

[56] References Cited

U.S. PATENT DOCUMENTS

| 3,049,442 | 8/1962 | Haines et al. | 427/130 |
| 4,661,377 | 4/1987 | Morita et al. | 427/130 |

Primary Examiner—Bernard Pianalto
Attorney, Agent, or Firm—Sughrue, Mion, Zinn, Macpeak & Seas

[57] ABSTRACT

A method for producing a sheet-formed recording medium having a heat treatment step of a synthetic resin base material, in which the base material is formed into a sheet before or after providing a recording layer on the surface of the base material, and a plurality of the sheet-formed base materials, juxtaposed to each other and supported so that the surface is parallel to a vertical direction, are subjected to to heat treatment. The heat treatment is made by blowing air in a direction along the surface of the juxtaposed base materials, thereby removing foreign substances present between the base materials and achieving uniform heat treatment.

14 Claims, 8 Drawing Sheets

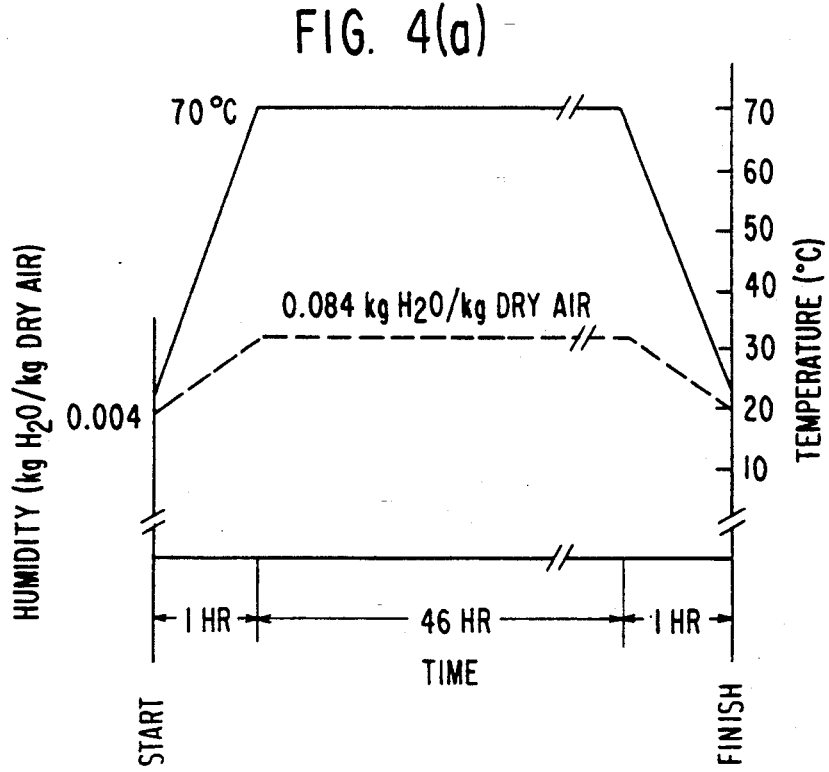
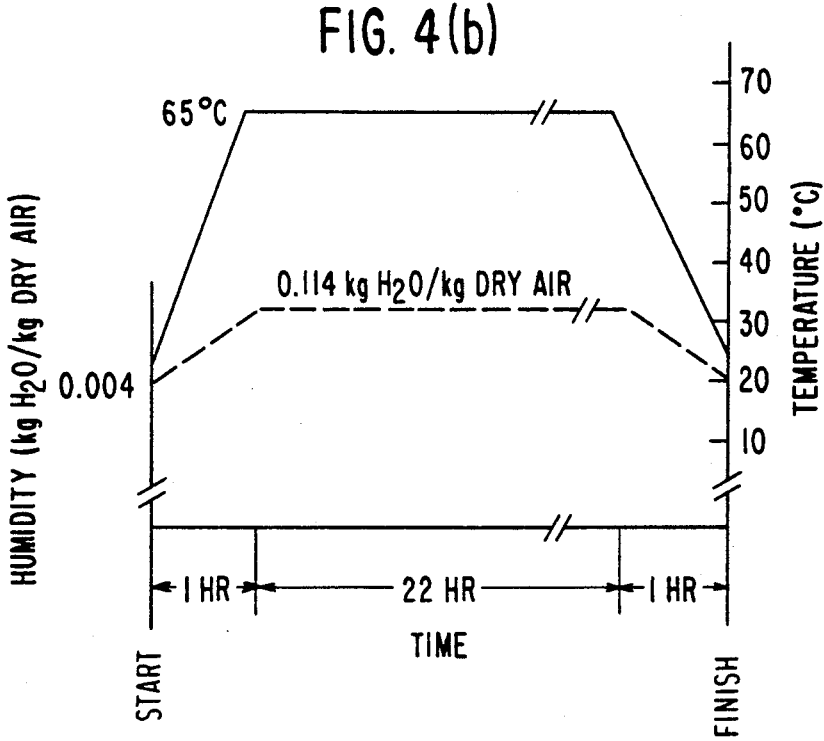

METHOD FOR PRODUCING SHEET-FORMED RECORDING MEDIUM

This is a continuation of application Ser. No. 07/501,582 filed Mar. 29, 1990.

BACKGROUND OF THE INVENTION

1. Field of the Invention

This invention relates to a method for producing a sheet-formed recording medium, particularly to an improvement of its heat treatment process.

2. Description of the Related Art

A sheet-formed recording medium based on a base material comprising a flexible synthetic resin such as polyethylene terephthalate, polyimide, polyphenylene sulfide, or polypropylene, on the surface of which is formed a recording layer, when subjected to a high-temperature environment, tends to cause changes in dimensions due to an irreversible heat shrinkage. If this dimensional change occurs between recording and reproduction, a tracking error is caused, which impairs the reproduction performance.

Utilizing the fact that the dimensional change is irreversible, it has been proposed that a heat treatment step be added to the production process of a sheet-formed recording medium, in order to effect a controlled positive heat shrinkage.

Furthermore, in general, heat treatment not only removes the curling, warping, or internal stress of a recording medium, but also when a magnetic recording medium is heat treated, it enables enhanced running stability of a magnetic recording and reproduction head and improved strength and durability of the recording layer.

In this case, a problem occurs where the heat treatment is carried out in the production process. Specifically, when the base material in the rolled form is heat treated, heat shrinkage tends to be insufficient in the longitudinal direction, and unequal shrinkage occurs between the internal and external peripheries because internal pressure differs between the internal and external peripheries of the roll. To remove the problems with heat treatment in the rolled state, for example, Japanese Patent Publication Laid-open 59-127233 proposes a method in which a rolled base material is unrolled into a sheet which is cut, a plurality of the cut sheets are stacked and heat treated.

However, heat treatment of the cut sheet-formed base materials 11 which are stacked with their opposite major surfaces placed horizontally has posed the following problems:

(1) As shown in FIG. 18, when a foreign substance 12 such as a fine dust particle or a projection of the surface coating layer is interposed between the stacked sheet-formed base materials 11, the foreign substance 12 is pressed between the base materials 11 by the weight of the base materials 11 themselves, resulting in defects such as dents, deformation, flaws, or adherence. These defects are further emphasized by heat treatment, resulting in permanent defects which have major adverse influences on the recording medium.

(2) Among the stacked base materials 11, there is a difference in pressure applied by the weight of the base materials between the upper and lower base materials, which has a tendency to produce a difference in smoothness depending on the position in the stack.

(3) Since the stacked base materials 11 are in close contact with one another, heat gradually transmits from the outer periphery to the center of the stack. Therefore, it has been difficult to obtain uniform heating conditions over the entire stack of the base materials 11. Similarly, when the base materials 11 are humidified during heat treatment, a uniform quantity of moisture may not be able to reach the center of the stack of the base materials 11, resulting in an unevenness between the outer and inner portions.

BRIEF SUMMARY OF THE INVENTION

With a view to eliminate these prior art defects of heat treatment, it it a primary object of the present invention to provide a method for producing a sheet-formed recording medium which prevents defects due to the interposition of foreign matter and enables uniform heat treatment over the entire area of the sheet-formed recording medium.

In accordance with the present invention which attains the above object, there is provided a method for producing a sheet-formed recording medium having a heat treatment process for a synthetic resin base material, comprising forming the base material into a sheet before or after providing a recording layer on the surface of the base material, and subjecting a plurality of the sheet-formed base materials, juxtaposed to each other and supported so that the opposite major surfaces of the sheet-formed base materials are parallel to the vertical direction, to heat treatment.

There is provided according to the present invention another method for producing a sheet-formed recording medium having a heat treatment process for a synthetic resin base material, comprising forming the base material into a sheet before or after providing a recording layer on the surface of the base material, and subjecting a plurality of the sheet-formed base materials, juxtaposed to each other with a spacing of at least ½ the thickness of the base material and supported so that their opposite major surfaces are parallel to a vertical direction, to heat treatment.

With the inventive production method for the sheet-formed recording medium, foreign matter, if any, between the adjacent sheet-formed base materials generally falls down because their opposite major surfaces are supported vertically. Even if foreign matter remains on the surface of the sheet-formed base material, it poses no problems during heat treatment because the adjacent base materials are not pressed together in a direction perpendicular to the surfaces.

In addition, since the adjacent base materials are not in close contact with each other, transmission of heat and humidity is made easily among their surfaces.

There is further provided according to the present invention another method for producing a sheet-formed recording medium comprising supporting a plurality of sheet-formed base materials supported adjacent to each other and subjecting the base materials to heat treatment by blowing air in a direction along their surfaces.

In accordance with the present invention, there is further provided a method for producing a sheet-formed recording medium having a heat treatment process for a synthetic resin material, comprising forming the base material into a sheet before or after providing a recording layer on the surface of the base material, and subjecting a plurality of the sheet-formed base materials juxtaposed to each other with a spacing of at least ½ the thickness of the base material to heat treatment by blowing a gas in a direction along the surface of the base materials.

In this production method for a sheet-formed recording medium, the air flow blows out foreign matter present between the adjacent sheet-formed base materials, makes gaps between the individual base materials almost uniform, and removes warping of the base materials. As a result, the inventive method can eliminate problems with the presence of foreign matter during heat treatment and, since the adjacent base materials are not in close contact with each other, transmission of heat and humidity is made easily among their surfaces.

Other and further objects, features and advantages of the invention will appear more fully from the following description.

BRIEF DESCRIPTION OF THE DRAWINGS

FIGS. 4a and 4b are graphs showing an example of temperature and humidity setting in heat treatment according to the embodiment of the present invention.

DETAILED DESCRIPTION OF THE INVENTION

Figure 3:
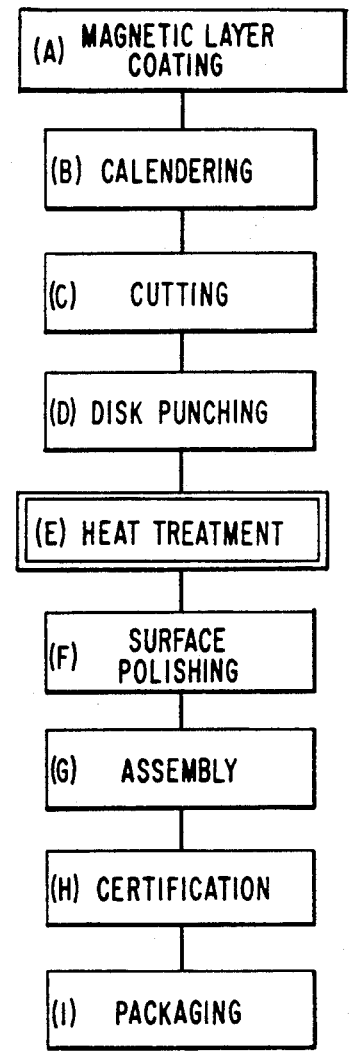
FIG. 3 is a process flow chart for the production of a 2-inch video floppy disk according to an embodiment of the present invention.

A preferred embodiment of the present invention will now be described in detail with reference to the drawings. As shown in FIG. 3, in a production process of a 2-inch video floppy disk pack, a 32 μm thick polyethylene terephthalate sheet-formed base material is first coated on both sides with a magnetic coating material, to a thickness that will result in 4 μm of the magnetic layer after drying, and then dried (step (A)).

In this case, the magnetic coating material is prepared, for example, by mixing and dispersing the following magnetic coating composition in a ball mill.

| Magnetic coating composition | |
|---|---|
| (1) Ferromagnetic metal fine powder (composition: 96 wt. % Fe, 4 wt. % Ni; specific surface area: 45 m$^2$/g) | 1,000 parts |
| (2) A copolymer of vinyl chloride, vinyl acetate, and maleic anhydride (400X110A, from Nippon Zeon) | 97 parts |
| (3) Polyurethane resin (Nipporan N-2304, from Nippon Polyurethane) | 35 parts |
| (4) Polyisocyanate compound (Coronate L, from Nippon Polyurethane) | 75 parts |
| (5) Carbon black (average particle diameter: 0.04 μm) | 10 parts |
| (6) Cr$_2$O$_3$ (average particle diameter: 0.33 μm) | 100 parts |
| (7) Amyl stearate | 100 parts |
| (8) Butoxyethyl stearate | 15 parts |
| (9) Methylethylketone | 1,740 parts |
| (10) Cyclohexanone | 1,160 parts |

The magnetic layer-coated base material is then calendered to improve the smoothness, and subjected to curing treatment (step (B)). The rolled base material is cut to a predetermined width (step (C)), and the cut base material is punched at the center into finally-shaped disk sheet-formed magnetic recording media (media sheets) having a hole with a diameter of 12-mm at the center (step (D)).

The punched media sheets are then heat treated according to the inventive method which will be described later (step (E)).

The media sheets are surface-polished with a grinding wheel or a polishing tape (step (F)), provided with core blocks which are engaging members to the drive shaft, and contained and assembled in a shell (step (G)). After the assembly, the media sheets are certified by a check for missing pulse (drop-out) and modulation quality (step (H)), and the acceptable video floppy disks are packaged (step (I)).

Figure 1:
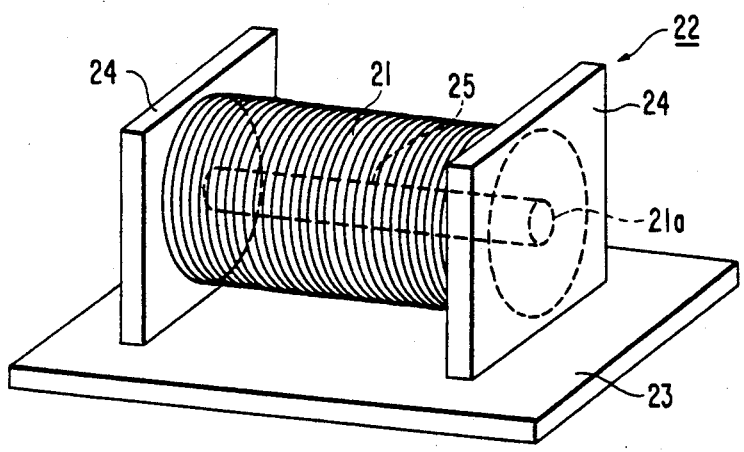
FIG. 1 is a schematic perspective view showing sheet-formed base materials supported on a jig used in a heat treatment process.

Next, the heat treatment process will be described in detail. As described above, heat treatment is carried out after the base material is punched into disks. As shown in FIG. 1, the punched round sheet-formed base materials 21 are supported on a jig 22 so that a plurality of the base materials are adjacent to each other and the surface is parallel to the vertical direction.

The jig 22 comprises a bottom plate 23, a pair of side plates 24 detachably disposed on the bottom plate 23, and a supporting bar 25 which is horizontally disposed between the side plates 24. The supporting bar 25 is inserted into center holes 21a provided at the center of the base materials 21 to put the base materials 21 on the supporting bar 25, and the supporting bar 25 is held by the side plates 25 to hang up the base materials 21. When hanging up the base materials 21 on the jig 22, it is preferable to blow air upon the base materials 21 by an air spray or the like so that the base materials 21 are almost equally spaced.

Figure 2:
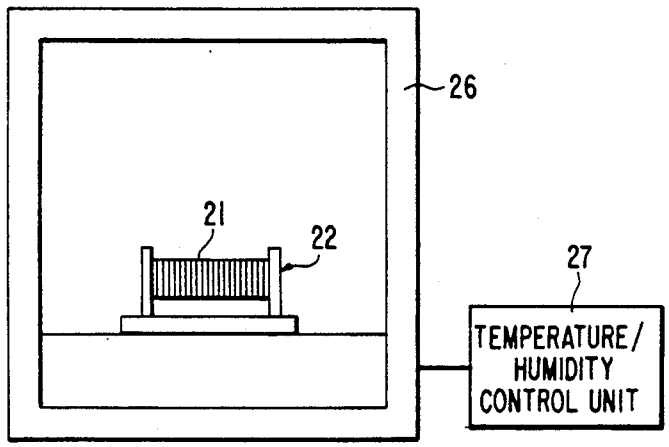
FIG. 2 is a schematic view showing the base materials placed in a treatment chamber.

Then, as shown in FIG. 2, the plurality of base materials 21 supported on the jig 22 are placed in a treatment chamber 26 and heat treated. The treatment chamber 26 is equipped with a temperature/humidity control device 27 and, in this embodiment, both heating and moisturizing are made. Moisturizing may sometimes be eliminated. It is desirable that the inside of the treatment chamber 26 is maintained in a clean environment with a dust content class of less than 500,000 (number of dust particles of larger than 0.5 μm is less than 500,000/ft$^3$) and the air is recirculated, thereby effectively removing foreign matter such as dust particles from the base materials 21 and obtaining a uniform temperature/humidity environment inside the treatment chamber 26. The air recirculation is achieved, for example, by a cross-flow fan or a sirocco fan and, in this embodiment, the average wind velocity at the central section of the treatment chamber 26 is 1.62 m/sec and the recirculation air flow rate is 32.4 m$^3$/min.

FIG. 4(a) shows an example of temperature/humidity between the time setting the base materials 21 are placed in the treatment chamber 26 to the time they are taken out. In FIG. 4(a), the solid line indicates changes in temperature with time and the broken line indicates changes in humidity with time. As shown in FIG. 4(a), heating begins at 23° C. and 0.004 kg H$_2$O/kg dry air, which are increased to 70° C. and 0.084 kg H$_2$O/kg dry air in 1 hour. These levels are maintained for 46 hours, and then again decreased to 23° C. and 0.004 kg H$_2$O/kg dry air in 1 hour to complete the treatment procedure. In this case, care must be used to prevent dew condensation from occurring during the increasing and decreasing stages of temperature and humidity. Dew condensation on the base materials 21 results in blots, which lead to defects. Therefore, it is preferable that the temperature and humidity are changed with a constant gradient by the temperature/humidity control device 27 to prevent dew condensation, as in this embodiment.

For polyethylene terephthalate base materials, it is generally preferable to use annealing conditions of a temperature of 40° C. to 80° C. and a humidity of higher than 0.02 kg H$_2$O/kg dry air. When humidity is not controlled, it is preferable to use a slightly higher temperature of above 60° C.

Actual annealing conditions are determined according to the requirements for the base material type to be treated. The above embodiment shows an example for a 2-inch video floppy disk pack. For a larger and thicker 3.5-inch floppy disk pack, it is preferable to use temperature/humidity conditions as shown in FIG. 4(b). In a larger-diameter type, heat shrinkage becomes larger at the outer peripheral portion. In general, in a magnetic recording reproducing system using a 3.5-inch floppy disk pack, after recording it is necessary to suppress deformation of the recording medium to a minimum. Therefore, it is necessary to sufficiently provide the irreversible heat shrinkage in this annealing process.

Since the base materials 21 placed adjacent to each other and supported with the surfaces parallel to the vertical direction are heat treated, most of any foreign matters present between the base materials 21 will fall down. Even if they remain between the base materials 21, they will not cause any defects such as dents, deformation, or flaws because the individual adjacent base materials 21 are not pressed together by a force in a direction perpendicular to the surface. Furthermore, since the adjacent base materials 21 are not in close contact with each other, transmission of heat and humidity is made directly from the surface, thereby achieving a uniform heat treatment.

When the base materials 21 are supported adjacent to each other, it is not preferable that the adjacent base materials 21 are placed too close to each other or are spaced too much apart. If the spacing between the base materials 21 is too small, especially humidification tends to be insufficient, or there is a danger of close contact by the materials. If the spacing is too large, the space-saving requirement for an efficient heat treatment process is not met, and the base materials 21 tend to be inclined, which may result in deformation.

In this embodiment, 1,200 sheets of 3.5-inch floppy disk packs about 79 μm in thickness of the base material were supported in a space of about 19 cm. For a 2-inch floppy disk pack about 40 μm in thickness of the base material, 500 sheets were supported in a space of about 4 cm. These disks were arranged with spacings of several tens of μm, that is, approximately equal to the thickness of a disk.

In general, in view of application of temperature and moisture during the heat treatment, space saving, and prevention of deformation due to inclination, the spacing between disks is preferably d/2 μm to D/80 mm, where d is the disk thickness and D is the disk diameter. In the above examples, the spacing is preferably 40 μm to 1 mm for 3.5-inch floppy disk packs, and 20 μm to 600 μm for 2-inch floppy disk packs.

Depending on the treatment process, the number of disks supported on a jig is appropriately 500 to 2,000 in view of easy of handling and treatment efficiency.

Table 1 shows results of comparative tests of disks heat-treated according to the present invention and those treated otherwise.

TABLE 1

| Sample | Jitter (μsec) | Yield | Flutter | Space required for treatment |
| --- | --- | --- | --- | --- |
| Embodiment | 0.2 | ○ | ○ | ○ |
| Com. Ex. 1 | 0.3 | x | Δ | ○ |
| Com. Ex. 2 | 0.3 | x | x | x |
| Com. Ex. 3 | 0.3 | x | x | x |
| Com. Ex. 4 | 0.2 | Δ | ○ | ○ |
| Com. Ex. 5 | >1 | x | x | — |

In Comparative Example 1, the sheet-formed base materials were stacked with the surface parallel to the horizontal direction and heat treated. In Comparative Example 2, complete magnetic recording media encased in a shell with the surface placed vertically were heat treated. In Comparative Example 3, complete magnetic recording media as used in Comparative Example 2, with the surface parallel to the horizontal direction, were heat treated. Treatment conditions in terms of temperature and humidity for the above comparative examples were same as those for the embodiment of the present invention. In Comparative Example 4, the same sample as used in this embodiment was treated under a dust class of 1.4 million.

In Comparative Example 5, no heat treatment was made.

In the jitter measurement, a recording medium (a 2-inch video floppy disk) recorded with a video signal on an outermost track was kept at 60° C., 0.120 kg H$_2$O/kg for 72 hours, allowed to stand for 24 hours at room temperature, and then measured for reproduction jitter. For the yield, one which has no drop-out and good modulation is indicated as "○." Flutter was measured at the outermost track using an optical dislocation meter, and good one is indicated as "○." For the space required for heat treatment, one which requires a small space is indicated as "○." In Table 1, a poor one is indicated as "x," and one which is between good and poor is indicated as "Δ."

As shown in Table 1, the method according to the present invention gives good results in all terms of jitter, yield, flutter, and space required. On the other hand, in Comparative Example 1, although the space required is small, fine irregularities may occur on the surface due to adverse effects of foreign matter between the base materials, lowering the yield.

In Comparative Examples 2 and 3, the space required for heat treatment is inevitably increased due to the volume of the shell, and the yield and flutter are both unfavorable. This is because the magnetic recording media in the shell are movable to some extent, and the weight of the media acts to bend them during the treatment. Furthermore, in Comparative Example 5, which was not heat treated, jitter is impaired. In Comparative Example 4, which was heat treated in an environment with large amounts of dust, a reduction in yield is noted due to adherence of foreign matter.

When heat treated, the base materials are deformed to some extent. In the above embodiment, the base materials 21 and its center hole 21a become somewhat elliptical. In this embodiment, since a core block as a chucking member is attached afterwards to the center hole 21a, it is not a problem if the center hole 21a is not exactly circular, and the base material 21 can be punched into a finally-shaped disk and then heat treated, thereby simplifying the subsequent processes. On the other hand, in 5.25-inch and 8-inch floppy disk packs, for example, of which the center holes are used directly for chucking, such deformation may result in an off-center. For such cases, it is preferable to make the center hole after the heat treatment.

Figure 5:
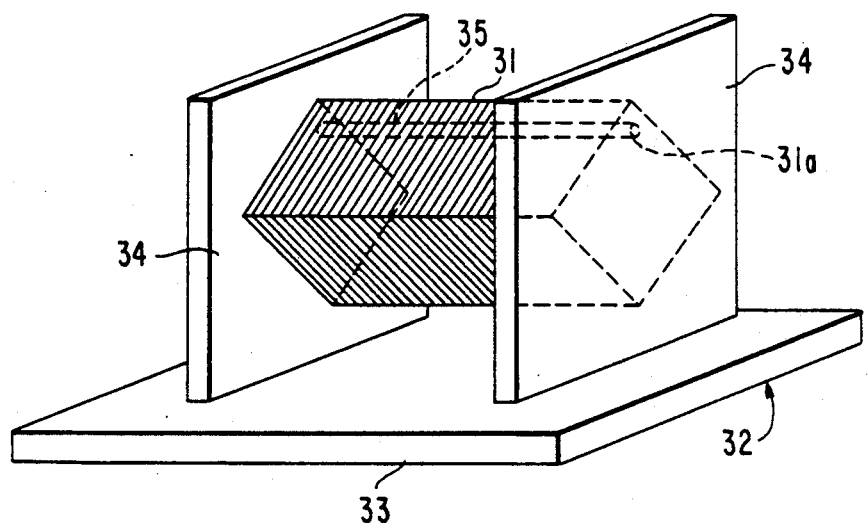
FIG. 5 is a schematic perspective view showing sheet-formed base materials supported on a jig according to another embodiment of the present invention.

FIG. 5 shows an example for such a case. In this example, as shown in FIG. 5, a base material 31 is in the form of a square sheet before being punched into a disk, and at one corner of which is provided a mounting hole 31a. A jig 32 comprises a bottom plate 33, a pair of side plates 34, and a supporting bar 35 which is inserted into the mounting hole 31a of the base material 31. A plurality of sheet-formed base materials 31 adjacent to each other are supported so that the surface is vertically held.

These base materials 31 are heat treated as described above, and then punched into disks.

Figure 6:
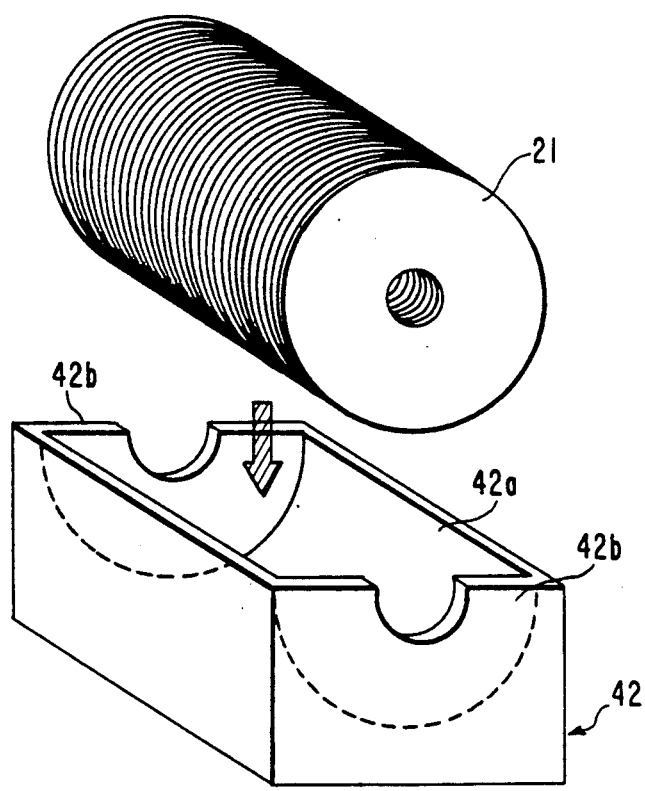
FIGS. 6 and 7 are schematic perspective views showing sheet-formed base materials and jigs according to other embodiments of the present invention.
Figure 7:
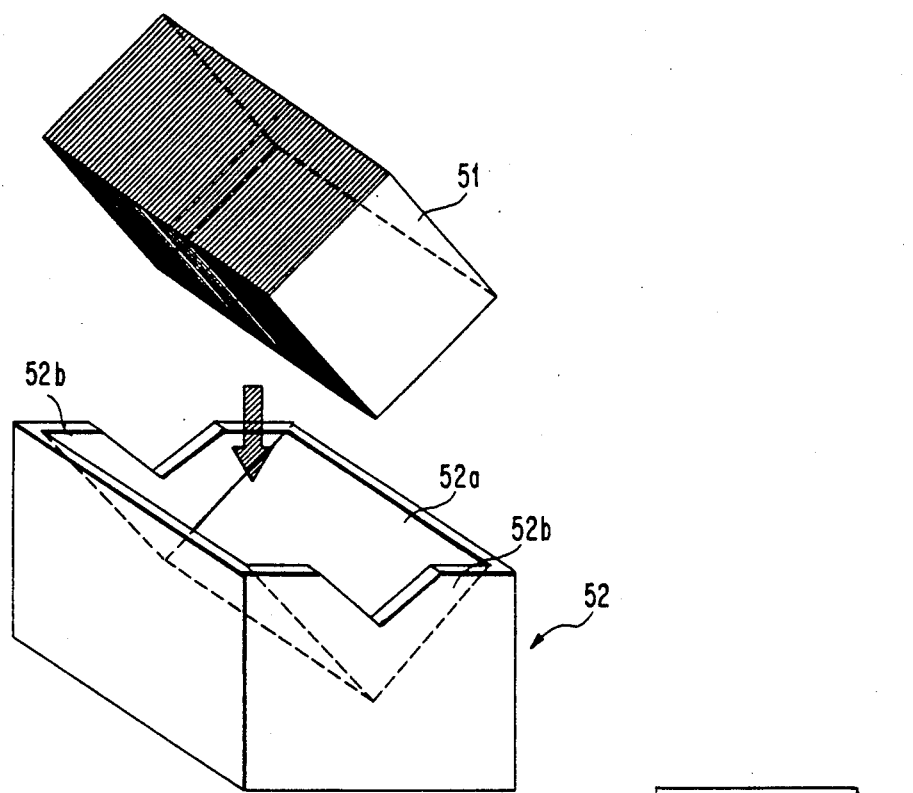

FIG. 6 and FIG. 7 are schematic perspective views individually showing sheet-formed base materials and jigs of other embodiments according to the present invention. In the previously-described embodiment, a shaft is used as supporting means which is inserted into holes provided in the base materials and support them with the surfaces held vertically. In these embodiments, on the other hand, the base materials are placed on a jig to support them in a predetermined direction.

FIG. 6 shows one which handles round sheet-formed base materials 21. A jig 42 has an upper surface 42a which is hollowed out in a semi-circular cross section, with side plates 42b formed at both ends. On the jig 42 are placed and supported a plurality of base materials 21 between the side plates 42b. In this case, the number of the base materials 21 is determined taking account of the distance between the side plates 42b and the thickness of the base materials 21 so that, as in the previous embodiment, the base materials 21 do not fall down due to a too small number of sheets or the base materials 21 do not come in close contact with each other due to an excessively large number of disks.

FIG. 7 shows one which handles square sheet-formed base materials 51. A jig 52 has an upper 52a which is hollowed out in a triangular cross section, with side plates 52b formed at both ends. On this jig 52 are placed a plurality of base materials 51 with appropriate spacings, as in the above jig 42.

In the jigs 42 and 52, a number of small holes or slits can be provided in the upper surfaces 42a and 52a contacting against the peripheral surfaces of the base materials 21 and 51 to achieve efficient heating and humidification of the peripheral surfaces of the base materials 21 and 51. Alternatively, the base materials 31 and 51 may be received by a wire net, rather than by these upper surfaces 42a and 52a, thereby more effectively exposing the base materials 21 and 51 to the atmosphere of the treatment chamber 26.

As described above, by heat treating a plurality of sheet-formed base materials placed adjacent to each other, supported so that the surfaces are parallel to the vertical direction, occurrence of defects such as dents, deformation, scratches, or adhesion caused by foreign matter present between the base materials can be prevented. Furthermore, since the individual base materials do not exert pressure on each other due to their weight, the base materials can be uniformly heat treated with no deviation among the base materials and evenly over the entire area of each base material.

Furthermore, with the arrangement used in the heat treatment in which the base materials are arranged vertically, a large number of base materials can be handled in a small space, and this arrangement is also convenient as a storage configuration.

Another method for producing a sheet-formed recording medium according to the present invention will now be described, in which sheet-formed base materials of the recording medium are heat treated by blowing air along the surface.

Figure 8:
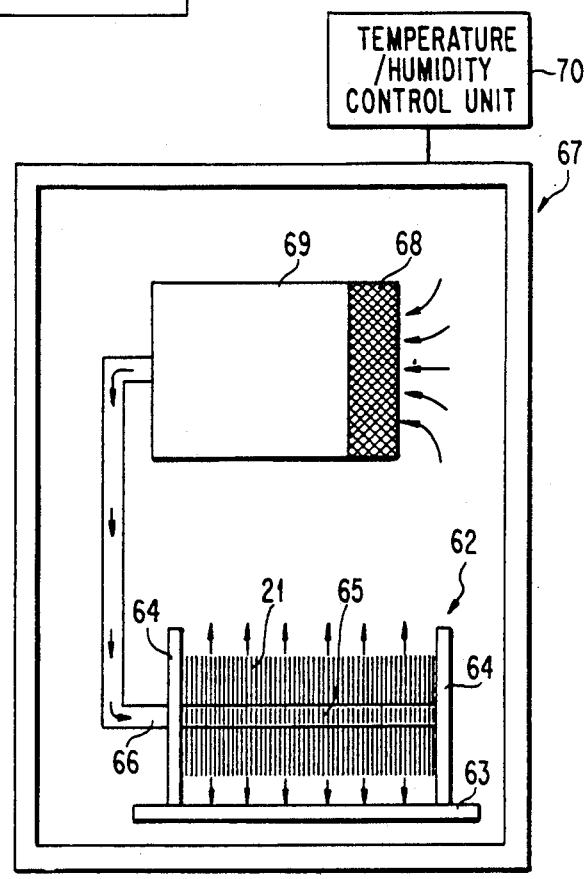
FIG. 8 is a schematic view showing a treatment chamber according to another embodiment of the present invention.
Figure 9:
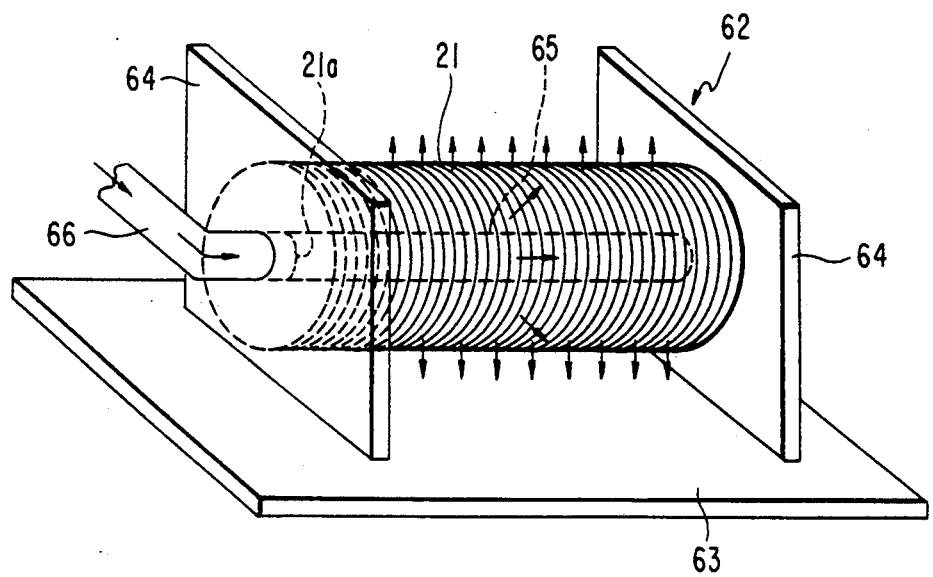
FIG. 9 is a schematic perspective view showing sheet-formed base materials supported on a jig used in the treatment chamber.

In this embodiment, a production process for a 2-inch video floppy disk pack is carried out similarly to that shown in FIG. 3. In the heat treatment process, as shown in FIG. 8 and FIG. 9, a plurality of circularly-punched sheet-formed base materials 21 are placed adjacent to each other, supported by a jig 62 so that the surfaces are parallel to the vertical direction.

The jig 62 comprises a bottom plate 63, a pair of side plates 64 detachably disposed on the bottom plate 63, and a supporting bar 65 disposed horizontally between both side plates 64. The supporting bar 65 is inserted into center holes 21a provided at the center of the base materials 21 to support a plurality of base materials 21 on the supporting bar 65, and the supporting bar 65 is held by the side plates 64.

Figure 10A:
FIG. 10 is a schematic perspective view showing supporting bars of the jig.
Figure 10B:
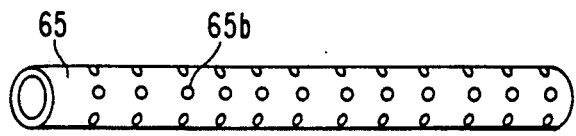
Figure 10C:

The supporting bar 65 is a hollow pipe, one end being closed and the other end being connected to an air pipe 66. The supporting bar 65 is provided with numbers of air holes in the outer peripheral surface. These air holes may be, for example, slits provided in the outer peripheral surface of the supporting bar 65 as shown in FIG. 10(a), or punched holes 65b as shown in FIG. 10(b), or the supporting bar 65 itself may be made of a wire net as shown in FIG. 10(c).

An air pump 69 having a filter 68 is disposed in a treatment chamber 67, and an outlet of the air pump 69 is connected with the air pipe 66. Therefore, when the air pump 69 is operated, air in the treatment chamber 67 is supplied into the supporting bar 65 through the air pipe 66 and blown out through the air holes from the center to the periphery of the base materials 21 along the surface. The air blown is sucked in the air pump 69 through the filter 68, thus recirculating in the treatment chamber 67. In this embodiment, average air velocity at the inlet side of the supporting bar 65 is 34.0 m/sec and the recirculating air flow rate is 1.0 m³/min.

Figure 11:
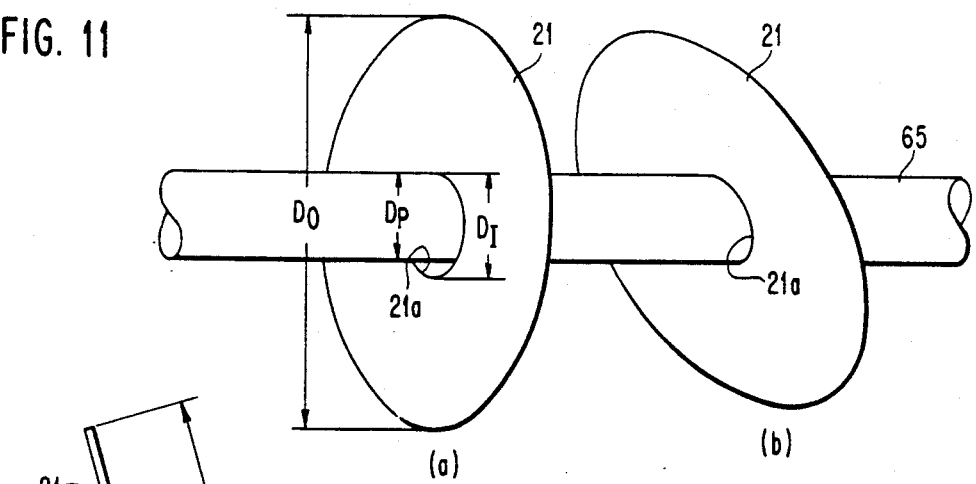
FIG. 11 is a schematic view showing a base material supported on the supporting bar.
Figure 12:
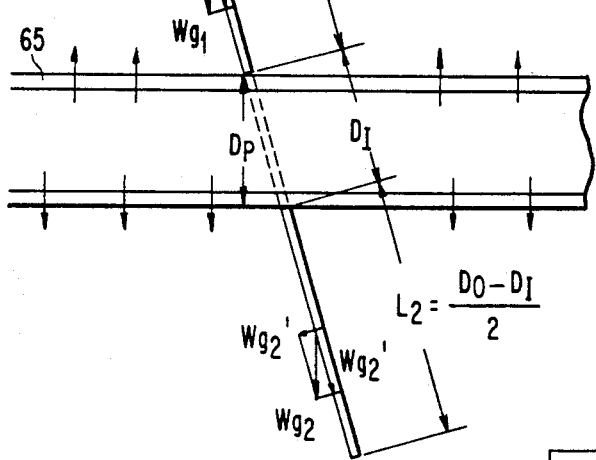
FIG. 12 is a schematic view showing an inclined base material.

In this case, the blowing air is required to have a pressure at least to an extent that the base materials 21 are prevented from falling. This pressure is substantially uniform on the opposite surfaces of the sheets. Suppose a condition as shown in FIG. 11 where the outer diameter of the base material 21 is $D_0$, the inner diameter of its center hole 21a is $D_1$, and the outer diameter of the supporting bar 65 is $D_P$ ($<D_1$) as shown for disk (a). The base material 21 may fall and the inner periphery of its center hole 21a come in contact in two positions against the supporting bar 65 under these conditions, as shown for disk (b) in FIG. 11. In FIG. 12 showing a cross sectional view of FIG. 11, a weight $Wg_1$ of the base material 21 in a section $L_1$ above the supporting bar 65 is equal to a weight $Wg_2$ of the base material 21 in a section $L_2$, and components $Wg_1'$ and $Wg_2'$ in the direction to rotate the base material 21 are opposite to each other with respect to the rotational direction, thus being in a balanced state. Therefore, in this state, even a very weak air flow is able to revert the base material 21 back to the upright position. At this moment, if the base material 21 moves even a small amount in a direction towards the upright position, it becomes $L_2 > L_1$ and hence $Wg_2' > Wg_1'$, and the base material 21 spontaneously resumes the vertical position due to its weight. When the outer diameter $D_P$ of the supporting bar 65 is sufficiently small compared to the inner diameter $D_1$ of the center hole 21a of the base material 21, the base material 21 will never be fixed in the inclined state, and the base material 21 is hung down in the vertical direction due to its weight.

The treatment chamber 67 is provided with a temperature/humidity control device 70 and, in this embodiment, both heating and moisturization are performed. In some cases, moisturization may be omitted. The atmosphere in the treatment chamber 67 is maintained for a clean environment with a dust class of less than 100,000 (less than 100,000 dust particles greater than 0.5 μm per ft³). This is to prevent the base material 21 from being damaged by blowing dirty air.

Setting of temperature and humidity from the loading of the base materials 21 into the treatment chamber 67 to the unloading is, for example, as shown in FIG. 4.

During the heat treatment, the air pump 29 is always operated to recirculate air.

Thus, since the base materials 21 as supported adjacent to each other with their surfaces parallel to the vertical direction and are heat treated by blowing air in the direction along the surface, foreign matters present between the adjacent base materials 21 are blown out by the air flow and almost uniform spacings can be maintained between the base materials 21. As a result, the occurrence of dents, deformation, or flaws due to foreign matter is prevented and, since the adjacent base materials 21 do not closely contact each other, transmission of heat and moisture is performed directly from the surface, thereby achieving uniform heat treatment. Furthermore, air blowing also has an effect to remove warping of the base materials 21, thereby improving the flatness of the base materials 21.

Substrates actually heat treated using the inventive method were evaluated according to the methods shown in Table 1 and found to have a jitter of 0.2 μsec, with good results in terms of yield, flutter, and space required.

An example in which the center hole is punched after heat treatment will be described with reference to FIG. 13 and FIG. 14.

Figure 14:
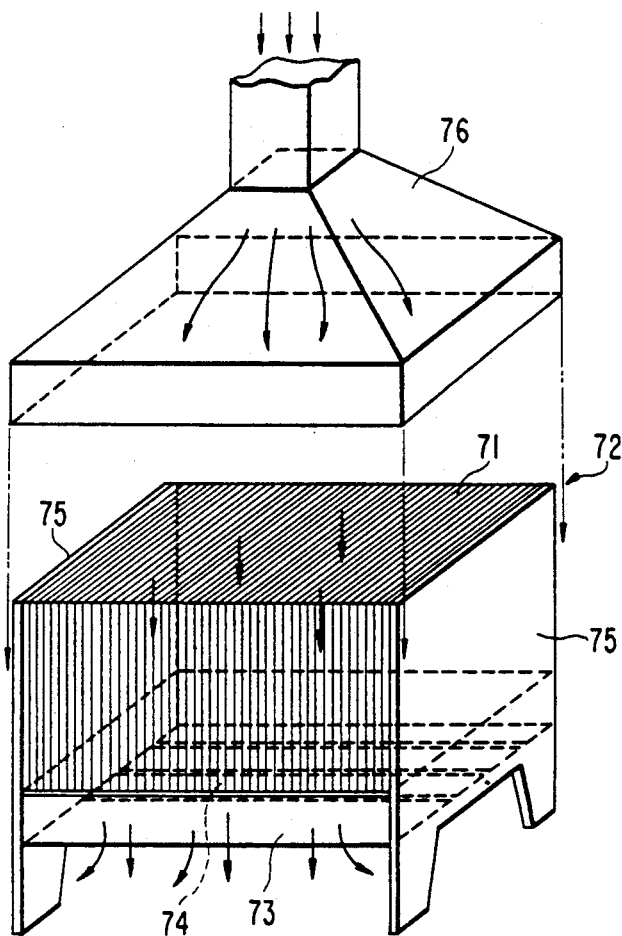
FIG. 14 is a schematic perspective view showing sheet-formed base materials supported on the jig.

In this example, as shown in FIG. 14, base materials 71 are in the form of a square sheet before being punched into a final disk. A jig 72 comprises a square bottom frame 73, a plurality of supporting bars 74 disposed on the bottom frame 73, and a pair of side plates 75 disposed upright on the bottom frame 73. A plurality of the sheet-formed base materials 71 are placed adjacent to each other on the supporting bars 74 with the surface parallel to the vertical direction, and the side plates 75 prevent the base materials 71 from falling.

There is also provided an air duct 76 which detachably covers the upper portions of the side plates 75 of the jig 72 and the base materials 71 supported thereon. As shown in FIG. 13, the outlet of the air pump 69 with the filter 68, which is disposed in the treatment chamber 67, is connected to the air duct 76.

The air pump 69 is operated to blow air through the air duct 76 downward along the surface, thus performing heat treatment as above, and then the base materials 71 are punched into disks.

Figure 13:
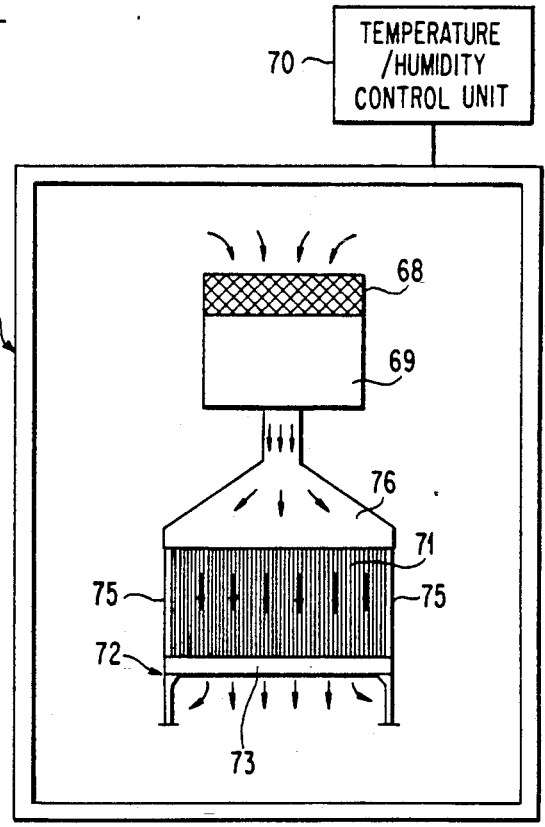
FIG. 13 is a schematic view showing a treatment chamber according to another embodiment of the present invention.

In the embodiments shown in FIG. 8 and FIG. 13, the number of base materials 21 and 71 supported between the side plates 64 and 75 is determined in consideration of the distance between the side plates and the thickness of the disk so that the base materials 21 and 71 do not fall due to a too small number of disks or do not contact closely with each other due to an excessive number of disks. Thus, it is neither preferable that the adjacent base materials 21 and 71 are too close to each other or too distant from each other. If the spacings between the base materials 21 and 71 are too small, application of moisture is particularly disturbed and, on the other hand, too large spacings between the base materials 21 and 71 are against the space-saving requirement. These conditions are the same as those in the embodiment shown in FIG. 1, and the spacings between the base materials 21 and 71 and the number of disks that can be supported on a single jig are determined similarly.

Figure 15:
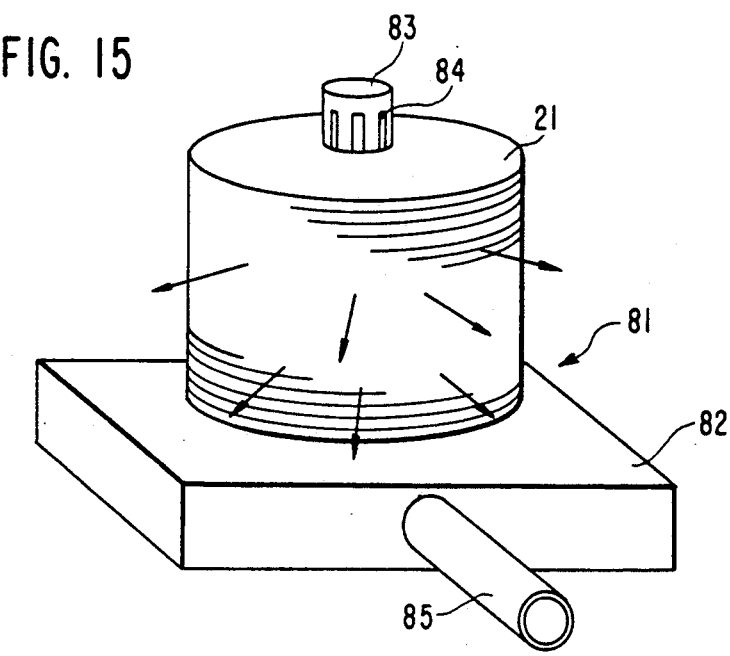
FIG. 15 is a schematic perspective view showing sheet-formed base materials supported on another jig.
Figure 16:
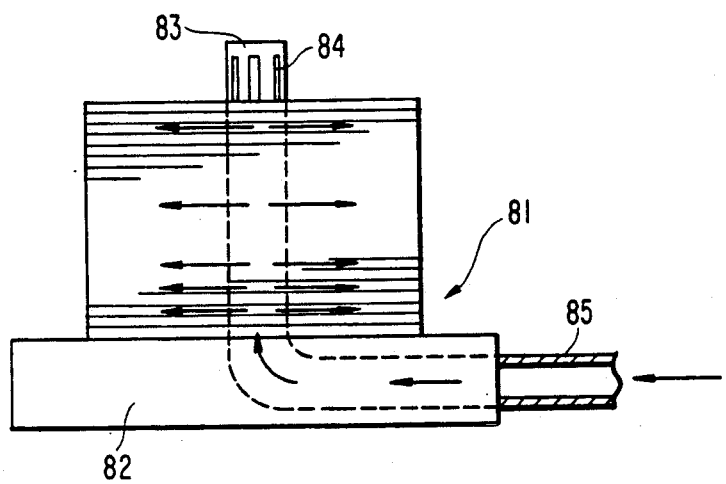
FIG. 16 is a schematic side view showing the arrangement shown in FIG. 15.
Figure 17:
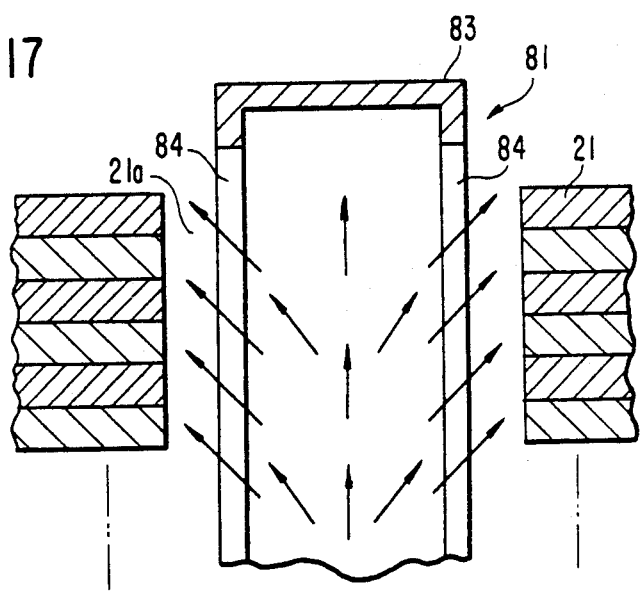
FIG. 17 is a schematic cross sectional view showing part of the arrangement shown in FIG. 15.
Figure 18:
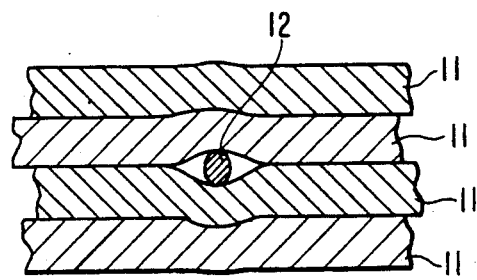
FIG. 18 is a schematic view showing a defect caused by foreign matter.

In the embodiments shown in FIG. 8 and FIG. 13, the base materials 21 and 71 are supported so that the surface is in the vertical direction. However, the present invention is not limited to this. The base materials may be supported with the surface in the horizontal direction or in an inclined direction. FIGS. 15 to 17 show examples in which the surface is in the horizontal direction.

As shown in FIGS. 15 to 17, a jig 81 comprises a bottom plate 82 and a supporting bar 83 disposed vertically on the bottom plate 82. The supporting bar 83 is a hollow tube with its upper end closed and has a plurality of slit-formed air holes 84 holes provided in the axial direction in the peripheral surface.

The hollow portion of the supporting bar 83 is connected to an air pipe 85 connected to the bottom plate 82.

With the jig 81 of the above arrangement, the supporting bar 83 is inserted into the center holes 21a of the sheet-formed base materials 21, thereby stacking a plurality of base materials 21. The jig 81 is placed in the above-described treatment chamber 67 for heat treatment, and air is blown out from the air pipe 85. As shown in FIG. 17, air flows upward in the supporting bar 83 and blows out through the air holes 84, flowing along the surface and slightly floating the individual base materials 21. Effects of air flowing along the surface are same as in the above-described embodiments. The action of horizontal air blow between the sheets impart a substantially uniform pressure on the opposite surfaces of the sheets that permits them to float apart.

As described above, by making heat treatment while blowing air along the surface of the base materials, the occurrence of defects such as dents, deformation, flaws, and adherence caused by foreign substances present between the base materials can be prevented. Furthermore, the base materials are straightened by the air flow, thereby improving their flatness.

Furthermore, since the configuration of arranging the base materials in the heat treatment allows a large number of base materials to be handled in a reduced space and prevents close contact with each other of the base materials, it is also an easy-to-handle storage configuration.

In the embodiment shown in FIG. 3, heat treatment is performed after forming a recording layer on the base material. However, the heat treatment may alternatively be performed before the formation of the recording layer, after the base material has been cut into sheets.

Furthermore, in the embodiment shown in FIG. 3, surface polishing is performed after the heat treatment. However, heat treatment may be performed after the surface polishing process. A fresh recording surface produced by surface polishing tends to stick to the magnetic recording reproducing head, but this can be removed by the heat treatment.

Recording media used in the present invention are not limited to magnetic recording media, but the present invention can be effectively applied to all types of other recording media which are based on flexible synthetic resin base materials with a recording layer formed thereon, such as optical recording media.

We claim:

1. A method for producing a sheet-formed recording medium having a heat treatment process of a synthetic resin base material, comprising forming said base material into a sheet before or after providing a recording layer on a surface of said base material, and subjecting a plurality of said sheet-formed base materials, juxtaposed to each other and supported so that the surface of each of said base materials is parallel to a vertical direction, to heat treatment, said heat treatment being performed with the surface of each of said plurality of sheet-formed base materials being vertically arranged so that adjacent base materials are held in a free state without applying an external force thereto, wherein said sheet-formed base material is provided at its center with an engaging member for engagement with a drive shaft, and said heat treatment is performed after said base material is formed into a final disk shape, wherein said base material comprises polyethyleneterephthalate and said heat treatment is performed at a temperature of 40° to 80° C. and a humidity of 0.02 kg H$_2$O/kg dry air or more, and further wherein said sheet-formed recording medium comprises a 2-inch video floppy disk having a video signal recorded on an outermost track thereof, said sheet-formed recording medium exhibiting a reproduction jitter of 0.2 μsec, said reproduction jitter being measured after said sheet-formed recording medium was kept at 60° C., 0.120 kg H$_2$O/kg for 72 hours and then allowed to stand for 24 hours at room temperature.

2. The method of claim 1 wherein said heat treatment is performed at a temperature of 60° to 80° C.

3. The method of claim 1 wherein each of said sheet-formed base materials is provided at its center with a center hole, wherein said plurality of base materials are supported by a jig during said heat treatment step, said jig comprising a supporting bar which is horizontally disposed between a pair of side plates and which is inserted into said center holes of said plurality of base materials.

4. The method of claim 3 wherein said supporting bar comprises a hollow pipe having one end closed and an opposite end which is connected to a source of gas, said hollow pipe being provided with a plurality of holes, such that said heat treatment step is performed by blowing heated gas through said hollow pipe.

5. A method for producing a sheet-formed recording medium having a heat treatment process of a synthetic resin base material, comprising forming said base material into a sheet before or after providing a recording layer on a surface of said base material, and subjecting a plurality of said sheet-formed base materials, juxtaposed to each other with a spacing of at least ½ the thickness of said material and supported so that the surface of each of said base materials is parallel to a vertical direction, to heat treatment, said heat treatment being performed with the surface of each of said plurality of sheet-formed base materials being vertically arranged so that adjacent base materials are held in a free state without applying an external force thereto, wherein said sheet-formed base material is provided at its center with an engaging member for engagement with a drive shaft, and said heat treatment is performed after said base material is formed into a final disk shape, wherein said base material comprises polyehtyleneterephthalate and said heat treatment is performed at a temperature of 40° to 80° C. and a humidity of 0.02 kg H$_2$O/kg dry air or more, and further wherein said sheet-formed recording medium comprises a 2-inch video floppy disk having a video signal recorded on an outermost track thereof, said sheet-formed recording medium exhibiting a reproduction jitter of 0.2 μ sec, said reproduction jitter being measured after said sheet-formed recording medium was kept at 60° C., 0.120 kg H$_2$O/kg for 72 hours and then allowed to stand for 24 hours at room temperature.

6. The method of claim 5 wherein said heat treatment is performed at a temperature of 60° to 80° C.

7. The method of claim 5 wherein each of said sheet-formed base materials is provided at its center with a center hole, wherein said plurality of base materials are supported by a jig during said heat treatment step, said jig comprising a supporting bar which is horizontally disposed between a pair of side plates and which is inserted into said center holes of said plurality of base materials.

8. The method of claim 7 wherein said supporting bar comprises a hollow pipe having one end closed and an opposite end which is connected to a source of gas, said hollow pipe being provided with a plurality of holes, such that said heat treatment step is performed by blowing heated gas through said hollow pipe.

9. A method for producing a sheet-formed recording medium having a heat treatment step of a synthetic resin base material, comprising forming said base material into a sheet before or after providing a recording layer on a surface of said base material, and subjecting a plurality of said sheet-formed base materials juxtaposed to each other to heat treatment by blowing a gas in a direction along the surface of said base materials, wherein said sheet-formed base material is provided at its center with an engaging member for engagement with a drive shaft, and said heat treatment is performed after said base material is formed into a final disk shape, wherein said base materials are supported so that the surface is parallel to a vertical direction, said heat treatment being performed with the surface of each of said plurality of sheet-formed base materials being vertically arranged so that adjacent base materials are held in a free state without applying an external force thereto, and further wherein said sheet-formed recording medium comprises a 2-inch video floppy disk having a video signal recorded on an outermost track thereof, said sheet-formed recording medium exhibiting a reproduction jitter of 0.2 $\mu$ sec, said reproduction jitter being measured after said sheet-formed recording medium was kept at 60° C., 0.120 kg H$_2$O/kg for 72 hours and then allowed to stand for 24 hours at room temperature.

10. A method for producing a sheet-formed recording medium having a heat treatment process of a synthetic resin base material, comprising forming said base material into a sheet before or after providing a recording layer on a surface of said base material, and subjecting a plurality of said sheet-formed base materials juxtaposed to each other with a spacing of at least ½ the thickness of said base material to heat treatment by blowing a gas in a direction along the surface of said base material, wherein said sheet-formed base material is provided at its center with an engaging member for engagement with a drive shaft, and said heat treatment is performed after said base material is formed into a final disk shape, wherein said base materials are supported so that the surface is parallel to a vertical direction, said heat treatment being performed with the surface of each of said plurality of sheet-formed base materials being vertically arranged so that adjacent base materials are held in a free state without applying an external force thereto, and further wherein said sheet-formed recording medium comprises a 2-inch video floppy disk having a video signal recorded on an outermost track thereof, said sheet-formed recording medium exhibiting a reproduction jitter of 0.2 $\mu$ sec, said reproduction jitter being measured after said sheet-formed recording medium was kept at 60° C., 0.120 kg H$_2$O/kg for 72 hours and then allowed to stand for 24 hours at room temperature.

11. A method for producing annealed sheet-formed recording media having a synthetic resin base material, comprising:

forming said base material into a plurality of sheets having opposite major surfaces;

arranging said plurality of sheets of base material with an orientation in which said sheets of base material are juxtaposed to each other with their surfaces substantially parallel in a direction of said orientation;

supporting said plurality of arranged sheets of base material in a manner which provides a substantially uniform pressure on said opposite surfaces of said sheets; and subjecting said plurality of supported sheet-formed base material to heat treatment, wherein said sheets are oriented substantially vertically so that adjacent sheets are held in a free state without applying an external force thereto during said heat treatment, and further wherein said sheet-formed recording media comprises a 2-inch video floppy disk having a video signal recorded on an outermost track thereof, said sheet-formed recording media exhibiting a reproduction jitter of 0.2 $\mu$ sec, said reproduction jitter being measured after said sheet-formed recording media was kept at 60° C., 0.120 kg H$_2$O/kg for 72 hours and then allowed to stand for 24 hours at room temperature.

12. The method of claim 17 wherein said heat treatment step is performed by blowing a heated gas in a direction along the oriented surfaces of said base material.

13. The method of claim 11 wherein each of said sheet-formed base materials is provided at its center with a center hole, wherein said plurality of base materials are supported by a jig during said heat treatment step, said jig comprising a supporting bar which is horizontally disposed between a pair of side plates and which is inserted into said center holes of said plurality of base materials.

14. The method of claim 13 wherein said supporting bar comprises a hollow pipe having one end closed and an opposite end which is connected to a source of gas, said hollow pipe being provided with a plurality of holes, such that said heat treatment step is performed by blowing heated gas through said hollow pipe.

* * * * *